(No Model.) 2 Sheets—Sheet 2.
J. W. HOLMES.
SOLAR THEODOLITE.
No. 275,913. Patented Apr. 17, 1883.
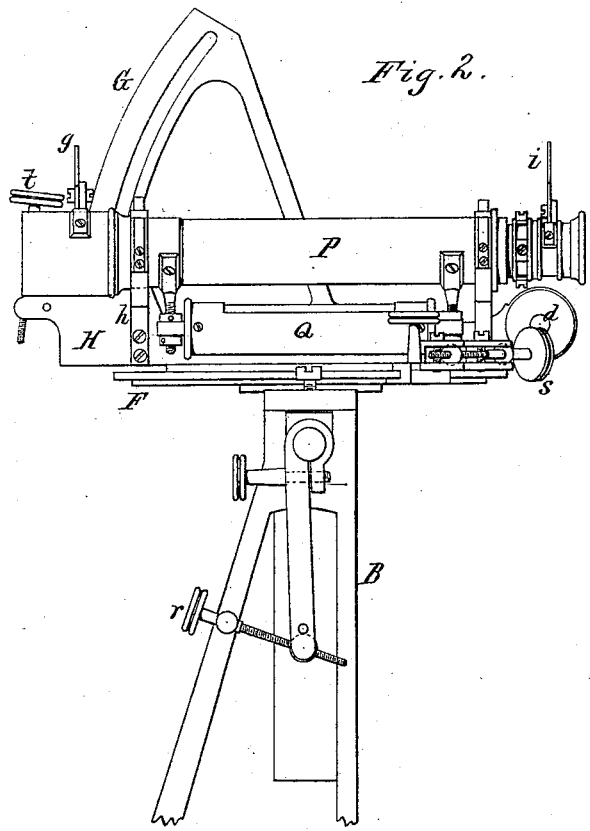
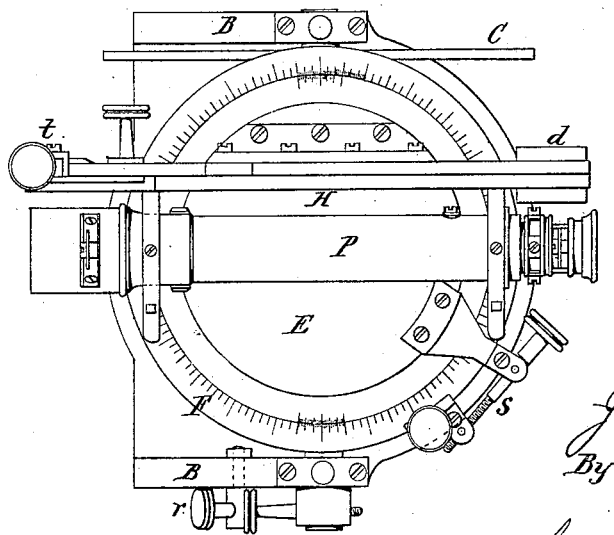

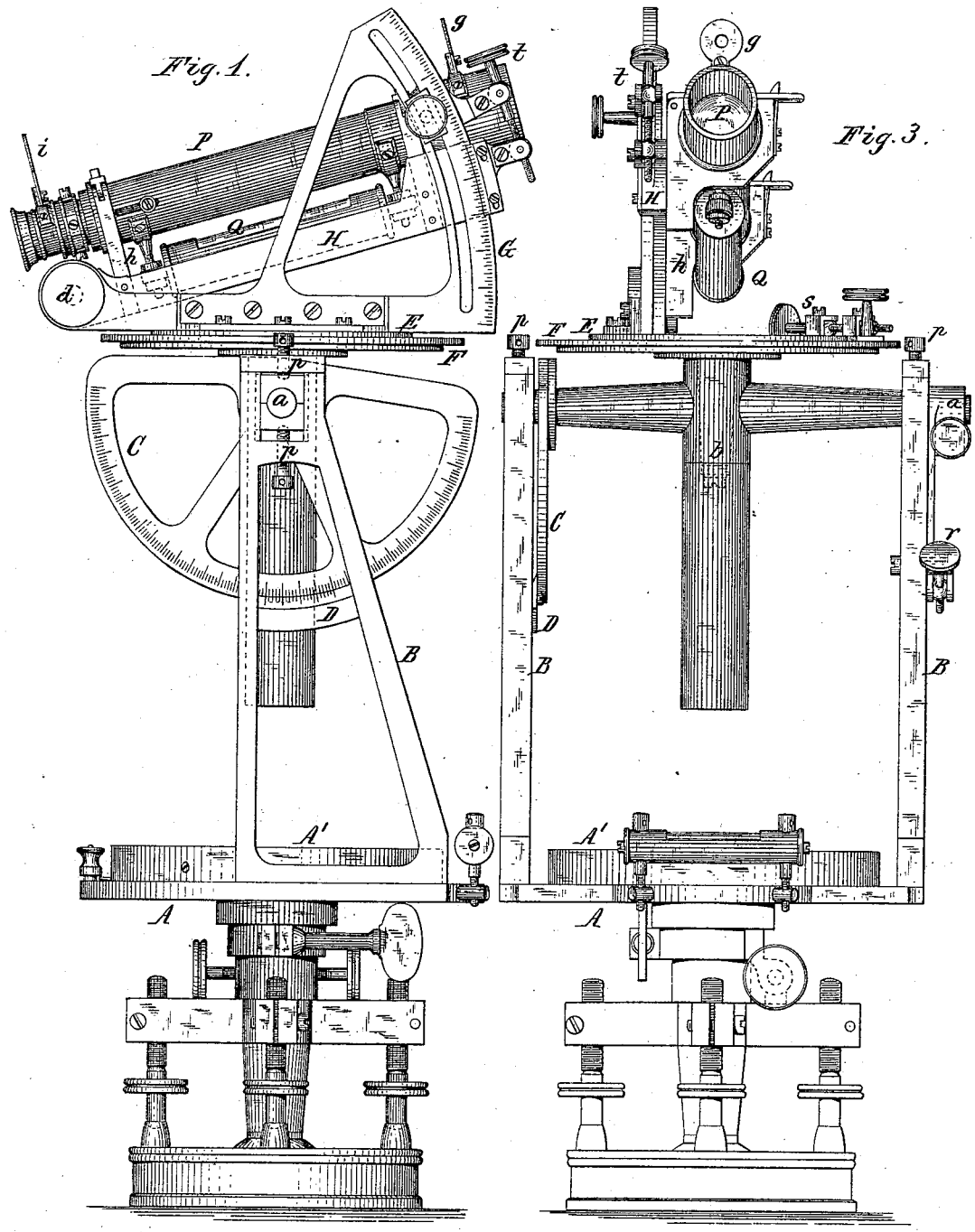

UNITED STATES PATENT OFFICE.

JOSEPH W. HOLMES, OF BATAVIA, NEW YORK.

SOLAR THEODOLITE.

SPECIFICATION forming part of Letters Patent No. 275,913, dated April 17, 1883.

Application filed September 12, 1882. (No model.)

*To all whom it may concern:*

Be it known that I, JOSEPH W. HOLMES, of Batavia, in the county of Genesee and State of New York, have invented new and useful Improvements in Solar Theodolites, of which the following is a specification.

My invention relates to an apparatus combining the properties of a solar compass and theodolite or engineer's level and transit, whereby the true meridian, the solar time, the sun's declination, and the latitude of the place of observation can be accurately and quickly determined, and other problems of spherical trigonometry and astronomy can be readily solved.

My present invention is an improvement on the apparatus for which Letters Patent of the United States No. 205,485 were granted to me July 2, 1878, to which reference is here made for a full description thereof.

The object of my present improvements is to render said apparatus more convenient and useful and more reliable in its operation; and my invention consists of the improvements which are hereinafter fully described, and pointed out in the claims.

In the accompanying drawings, consisting of two sheets, Figures 1 and 2 are elevations of my improved apparatus, taken from opposite sides. Fig. 3 is an elevation at right angles to Fig. 1. Fig. 4 is a top plan view of the apparatus.

Like letters of reference refer to like parts in the several figures.

A is the base upon which the standards B B are mounted, and which may consist of two circular plates, one revolving upon or within a graduated plate, similar to the base-plates employed in ordinary transits or theodolites.

A' is a graduated compass-box, provided with a magnetic needle and secured to the base A.

C is a graduated segment, pivoted by a horizontal shaft, $a$, to the standards B, and read at a vernier, D, attached to one of the standards B.

E is a plate having the form of a circle, or an arc of a circle, mounted on a pivot, $b$, which is journaled in the axis of the segment or latitude arc C, and arranged at right angles to the axis of the segment C.

F is a fixed circle, which may be termed the "dial" or "equatorial" plate, and which is rigidly attached to the axis of the segment C.

The pivot $b$ of the circle E revolves within the fixed circle F. The latter is graduated, like a compass or transit plate, to degrees and subdivisions thereof, and also to hours and fractions thereof. The circle E is provided with an arc or vernier for reading the smaller subdivisions of the circle F.

G is a graduated arc, projecting from the face of the circle or segment E, perpendicular to its plane and called the "declination-arc."

H is an arm pivoted at $d$ to the arc G, the pivot $d$ being located in the center from which the arc G is described. The arm H traverses the latter with its opposite end, and is provided with a vernier for reading the arc G.

$h$ represents projecting arms or bearings attached to the side of the arm H for holding and retaining the telescope P. The latter is provided with adjustable cross-hairs in its optical axis, and may also be provided with stadia or micrometer-hairs embracing the sun's diameter, for more accurately centering the same, and also with a screen or colored glass, so that the sun can be viewed directly. The telescope may also have a lens at $g$ focusing upon a silvered plate, $i$.

$r$, $s$, and $t$ are clamp and tangent movements applied to their respective arcs, C, F, and G.

Q represents a level, attached preferably to the telescope P; but, if desired, the level Q may be attached to the arm H, or to the circle or arc E. This level is employed for adjusting the telescope for the purpose of ascertaining the time when the sun or star rises or sets, and for testing the adjustments and accuracy of the various parts of the instrument, and for other purposes, as hereinafter more fully explained.

The manner of using the instrument is as follows: To ascertain the true solar time, level the base A, clamp the arc C to the graduations representing the latitude of the place, and approximately in the plane of the meridian, clamp the arm H to the graduations of the arc G, representing the sun's declination, as found in the nautical almanac, corrected for the time of day and the longitude of the place of observation, allowance being made for refraction, and adjust the zero of the vernier E approximately to the time, as designated by the hour and degree marks on the face of the dial F. Turn the circle E in or upon the circle F, and the whole instrument, if need be, keeping the base level until the sun is in the line of sight, when the telescope is used, or until the image of the sun falls exactly upon the plate i. The arc C is now in the plane of the meridian, the axis b parallel with the earth's axis, and the circles E and F at right angles with the axis of the earth, and the time indicated by the vernier of the circle E, reading the circle F, will be apparent or sun time, counting each degree of the arc as four minutes of time and each minute of the arc as four seconds of time. Smaller portions of time may be read by making the vernier E read smaller divisions of the circle F. The arc C is now in the meridian of the place, and a true meridian line may be established by clamping the zero of the circle E to the twelve o'clock mark of the circle F and setting stakes or pins by sighting through the telescope. To determine what time the sun will rise or set in any latitude on any day in the year, set the latitude-arc to the latitude of the place and the arm H to the declination of the sun. Level the instrument and bring the bubble of the level Q to the center of the tube. The time of sunrise will be read directly, and the time of sunset will be the reading subtracted from twelve o'clock. A meridian line may also be made by the polar or a polar star at the time of greatest elongation, as follows: Turn the face of the dial-plate toward the south; incline it toward the north equal to the co-latitude of the place; set the zero of the plate E to the right or left of the zero of the plate F, as the elongation is east or west, equal to the polar distance of the star; keep the vertical cross-hair upon the star till it ceases to go east or west, as the case may be; then bring back the zero of the plate E to the zero of the plate F, and the telescope will then be parallel to the polar axis of the earth and in the plane of the true meridian. A meridian line may also be obtained from the polar star at any time by calculating its meridian distance and setting it off on the dial-plate F in the same manner.

The adjustments of the instrument may be perfectly tested by means of the accurately-ground level-bubble upon the telescope. The intersection of the cross-hairs in the axis of the telescope and the parallelism of the axis of the level to the line of collimation are accomplished in the same manner as in the ordinary Y-level. After the said adjustments are accomplished, clamp one of the zeros of the vernier E to the zero of the plate F, the 90° mark of the segment C to the zero of its vernier, and the zero of the arm H to the zero of the arc G. Bring the telescope over one of the pairs of leveling-screws, and by means of these screws make the level horizontal. Repeat the process over the other pair of screws. Then turn the telescope half round—that is, till it stands over the same screws, but pointing in the opposite direction—and if the bubble does not remain in the middle, correct one-half of the error by the leveling-screws, and the other half by the tangent-screw r, applied to the latitude-arc C. Continue the corrections till the bubble will remain in the middle of the tube during an entire revolution. Then turn the circle E half round. If the bubble does not remain in the center of the tube, correct one half of the error by means of the tangent-screw r, and the other half by means of the tangent-screw t, applied to the arc G. The zero of the vernier D should now be set exactly to the 90° mark of the segment C and the zero of the vernier on the arm H exactly to the zero of the arc G.

The graduations of the arcs C and G may be compared by fixing the vernier D to any graduation which can be read by the arc G, placing the plate E to its zero and bringing the level-bubble in the center of the tube. The two readings should be the same, or one should be the complement of the other. The circle F may be compared with the arcs C and G in a similar manner.

To determine whether the axis of the plate E is exactly at right angles to the axis of the segment C, before proceeding further, see if both standards are exactly of the same height by noting if the intersection of the cross-hairs (the base A being leveled) will trace a plumb-line. If not, raise or lower one end of the axis a of the arc C by means of adjusting-screws p, applied to the bearings of the shaft a. Then turn the telescope parallel with the axis of the segment C, and if the level-bubble remains in the center of the tube the axis of the plate E is at right angles to the axis of the segment C. If not, the adjustment must be made by means of the screws by which the plate F is secured to the axis of the arc C.

To see if the zero of the plate E coincides with the six o'clock or 90° mark of the plate F, bring the zero of the latitude-arc C to the zero of its vernier D and give the telescope a quarter-turn in its bearings, and bring the bubble of the level Q to the center of the tube. If the zero of the plate E does not coincide with 90°, the plate F must be made to do so. The zeros of the plates E and F can be tested by setting the cross-hairs exactly on some point and then revolving the telescope half around on the axis a; fix the position of the intersection of the cross-hairs of this backsight; then turn the instrument half round on the axis of the base, sight to the same point and take the backsight by revolving the telescope on the axis a. If the intersection strikes the same point as before, the telescope is exactly at right angles to the axis of the latitude-arc C. The zero of the latitude-arc may be tested by bringing it to the zero of the vernier D, and if the intersection of the cross-hairs will trace a plumb-line the adjustment is correct. The arc G and its vernier may also be tested by placing the latitude-arc at zero, when the dial-plate will be perpendicular. Place the telescope exactly over the middle of three pins in line, and by placing the cross-hairs over the forward one turn the telescope or circle E half round on its axis, and if the cross-hairs strike the back point the adjustment is correct.

To see if the telescope is exactly over the center of the axis of the plate E, place the plate E in a horizontal position and the axis of the plate E exactly over the center of three pins in line, sight the cross-hairs on the forward pin, reverse the telescope in its bearings, and if the intersection strikes the back pin the axis of the telescope is exactly over the center of the plate E.

It will be seen from the foregoing that my improved instrument can be used both as a solar instrument and as a theodolite and level, and that every function of the instrument can be readily tested and corrected, thereby rendering the instrument accurate in every respect.

I claim as my invention—

1. The combination of a level with the pivoted latitude-arc C, the pivoted plate E, and the declination-arc G, provided with a traversing-arm, H, substantially as and for the purpose set forth.

2. The combination, with the declination-arc G, of the arm H, traversing said arc, and a telescope, P, mounted upon the traversing-arm H, substantially as set forth.

3. The combination, with the pivoted latitude-arc C, of the pivoted plate E, the declination-arc G, provided with a traversing-arm, H, and a telescope, P, mounted on said traversing-arm, substantially as set forth.

4. The combination, with the declination-arc G, of the arm H, traversing said arc, and a telescope, P, and level Q, mounted upon the traversing-arm H, substantially as set forth.

5. The combination of the telescope and level with the traversing-arm H, the declination-arc G, and the pivoted circle E, supporting said arc, substantially as set forth.

6. The combination of the telescope and level with the traversing-arm H, the declination-arc G, the pivoted circle E, supporting said arc, and the pivoted support a, having the segment C attached thereto, substantially as set forth.

J. W. HOLMES.

Witnesses:
JNO. J. BONNER,
CHAS. F. GEYER.